(12) United States Patent
Batović et al.

(10) Patent No.: US 12,441,003 B2
(45) Date of Patent: Oct. 14, 2025

(54) PATHFINDING USING CENTERLINE HEURISTICS FOR AN AUTONOMOUS MOBILE ROBOT

(71) Applicant: Gideon Brothers d.o.o., Osijek (HR)

(72) Inventors: Šime Batović, Zadar (HR); Matija Žigić, Zagreb (HR)

(73) Assignee: Gideon Brothers d.o.o., Osijek (HR)

( * ) Notice: Subject to any disclaimer, the term of this patent is extended or adjusted under 35 U.S.C. 154(b) by 0 days.

(21) Appl. No.: 18/146,586

(22) Filed: Dec. 27, 2022

(65) Prior Publication Data

US 2023/0211987 A1 Jul. 6, 2023

Related U.S. Application Data

(60) Provisional application No. 63/295,023, filed on Dec. 30, 2021.

(51) Int. Cl.
*B25J 13/08* (2006.01)
*B25J 9/16* (2006.01)
(Continued)

(52) U.S. Cl.
CPC ........... *B25J 13/089* (2013.01); *B25J 9/1664* (2013.01); *B25J 9/1687* (2013.01); *B65G 67/02* (2013.01); *B66F 9/063* (2013.01); *G05D 1/0212* (2013.01)

(58) Field of Classification Search
CPC ...... B25J 13/089; B25J 9/1664; B25J 9/1687; B65G 67/02; B66F 9/063; G05D 1/0212; G05D 2201/0216
See application file for complete search history.

(56) References Cited

U.S. PATENT DOCUMENTS 5,947,225 A  9/1999  Kawakami et al.
8,412,377 B2  4/2013  Casey et al.
(Continued)

FOREIGN PATENT DOCUMENTS

CN      108280856 A    7/2018
JP      2015121928 A   7/2015
(Continued)

OTHER PUBLICATIONS

Original and translation of KR102300596 B1 (Year: 2021).*
(Continued)

*Primary Examiner* — Luke Huynh
(74) *Attorney, Agent, or Firm* — Fenwick & West LLP

(57) ABSTRACT

To load and unload a trailer, an autonomous mobile robot determines its location and the location of objects within the trailer relative to the trailer itself, rather than relative to a warehouse. The autonomous mobile robot determines its location the location of objects within the trailer relative to the trailer. The autonomous mobile robot navigates within the trailer and manipulates objects within the trailer from the trailer's reference frame. Additionally, the autonomous mobile robot uses a centerline heuristic to compute a path for itself within the trailer. A centerline heuristic evaluates nodes within the trailer based on how far away those nodes are from the centerline. If the nodes are further away from the centerline, they are assigned a higher cost. Thus, when the autonomous mobile robot computes a path, the path is more likely to stay near the centerline of the trailer rather than get closer to the sides.

18 Claims, 10 Drawing Sheets

(51) Int. Cl.
*B65G 67/02* (2006.01)
*B66F 9/06* (2006.01)
*G05D 1/00* (2006.01)

(56) References Cited

U.S. PATENT DOCUMENTS

| | | |
|---|---|---|
| 9,471,062 B1 | 10/2016 | Theobald |
| 9,688,288 B1 | 6/2017 | Lathrop et al. |
| 9,764,472 B1 * | 9/2017 | Ebrahimi Afrouzi ........................ G05D 1/0251 |
| 10,233,064 B2 | 3/2019 | Hoffman |
| 10,417,781 B1 | 9/2019 | Konolige et al. |
| 10,549,763 B2 | 2/2020 | Brooks |
| 10,894,664 B1 | 1/2021 | Brady et al. |
| 11,092,458 B2 | 8/2021 | Aist et al. |
| 11,520,333 B1 | 12/2022 | Drexler et al. |
| 11,602,854 B2 | 3/2023 | Ha et al. |
| 11,635,759 B2 | 4/2023 | Park |
| 2006/0112034 A1 | 5/2006 | Okamoto et al. |
| 2008/0012310 A1 * | 1/2008 | Weaver ................... F16L 55/32 285/288.1 |
| 2008/0167817 A1 | 7/2008 | Hessler et al. |
| 2009/0326713 A1 | 12/2009 | Moriya |
| 2011/0054689 A1 | 3/2011 | Nielsen et al. |
| 2013/0325244 A1 | 12/2013 | Wang et al. |
| 2014/0121833 A1 | 5/2014 | Lee et al. |
| 2014/0276001 A1 | 9/2014 | Ungi et al. |
| 2014/0365258 A1 | 12/2014 | Vestal et al. |
| 2015/0359185 A1 | 12/2015 | Guy |
| 2016/0016314 A1 | 1/2016 | Hietmann et al. |
| 2016/0129592 A1 | 5/2016 | Saboo et al. |
| 2018/0009108 A1 | 1/2018 | Yamamoto et al. |
| 2018/0060765 A1 | 3/2018 | Hance et al. |
| 2018/0114448 A1 | 4/2018 | Jager |
| 2018/0194575 A1 * | 7/2018 | Anderson ............... B65G 67/04 |
| 2018/0201285 A1 | 7/2018 | Brooks |
| 2018/0210439 A1 | 7/2018 | Brooks et al. |
| 2018/0215546 A1 | 8/2018 | High et al. |
| 2018/0273173 A1 | 9/2018 | Moura |
| 2019/0049997 A1 | 2/2019 | Battles et al. |
| 2019/0079537 A1 | 3/2019 | Yoshida et al. |
| 2019/0179329 A1 | 6/2019 | Keivan et al. |
| 2019/0193629 A1 | 6/2019 | Zevenbergen et al. |
| 2019/0243384 A1 | 8/2019 | Chopra et al. |
| 2020/0132503 A1 | 4/2020 | Aist et al. |
| 2020/0142401 A1 | 5/2020 | Ren et al. |
| 2020/0231150 A1 * | 7/2020 | Takahashi ............... G07C 5/008 |
| 2020/0293049 A1 | 9/2020 | De Castro |
| 2020/0320401 A1 | 10/2020 | Jampani et al. |
| 2020/0368913 A1 | 11/2020 | Scott et al. |
| 2021/0064035 A1 | 3/2021 | Park |
| 2021/0064040 A1 * | 3/2021 | Yadmellat ................ G07C 5/02 |
| 2021/0089040 A1 | 3/2021 | Ebrahimi Afrouzi et al. |
| 2021/0223784 A1 | 7/2021 | Yoo et al. |
| 2021/0284446 A1 | 9/2021 | Cairl et al. |
| 2021/0347059 A1 | 11/2021 | Zhang et al. |
| 2022/0019213 A1 | 1/2022 | Haghighat et al. |
| 2022/0084238 A1 | 3/2022 | Tang et al. |
| 2022/0084241 A1 | 3/2022 | Dikhale et al. |
| 2022/0206468 A1 | 6/2022 | Cheon et al. |
| 2022/0244735 A1 | 8/2022 | Bidram et al. |
| 2022/0274589 A1 | 9/2022 | Gao et al. |
| 2022/0348427 A1 | 11/2022 | Bell et al. |
| 2023/0139590 A1 | 5/2023 | Wilson et al. |

FOREIGN PATENT DOCUMENTS

| | | | |
|---|---|---|---|
| KR | 10-2018-0114200 A | 10/2018 | |
| KR | 102049962 B1 * | 11/2019 | ............ B25J 9/1664 |
| KR | 102300596 B1 * | 9/2021 | |
| WO | WO 2020/215772 A1 | 10/2020 | |
| WO | WO-2021034303 A1 * | 2/2021 | ............ B25J 9/1689 |

OTHER PUBLICATIONS

United States Office Action, U.S. Appl. No. 17/138,435, filed Nov. 10, 2022, 19 pages.
United States Office Action, U.S. Appl. No. 17/138,432, filed Jul. 25, 2022, 18 pages.
United States Office Action, U.S. Appl. No. 17/138,432, filed Apr. 22, 2022, 15 pages.
United States Office Action, U.S. Appl. No. 17/138,420, filed Jun. 13, 2023, 26 pages.
United States Office Action, U.S. Appl. No. 17/138,435, filed Mar. 7, 2023, 22 pages.
United States Office Action, U.S. Appl. No. 17/138,444, filed Sep. 29, 2023, 13 pages.
United States Office Action, U.S. Appl. No. 18/146,586, filed Aug. 10, 2023, 13 pages.
United States Office Action, U.S. Appl. No. 18/146,586, filed Jun. 4, 2024, 15 pages.
United States Office Action, U.S. Appl. No. 18/146,579, filed Oct. 18, 2024, 53 pages.

* cited by examiner

PATHFINDING USING CENTERLINE HEURISTICS FOR AN AUTONOMOUS MOBILE ROBOT

CROSS-REFERENCE TO RELATED APPLICATIONS

This application claims the benefit of U.S. Provisional Patent Application No. 63/295,023, filed Dec. 30, 2021, which is incorporated by reference.

BACKGROUND

An autonomous mobile robot is a robot that is capable of autonomously navigating an environment (e.g., a warehouse environment) and manipulating objects within that environment. An autonomous mobile robot may use a 2D environment map to navigate within a warehouse environment. The environment map may include information about objects and obstacles within the warehouse. For example, the environment map may contain information about the poses of objects within the warehouse, and the autonomous mobile robot may use that information when manipulating the objects within the warehouse.

However, an environment map may not be sufficient when the autonomous mobile robot enters a new environment, like a trailer. For example, a trailer may have some roll or pitch with respect to the warehouse floor because a trailer bed may not be perfectly parallel to the ground and/or because a trailer may not be backed flush against a loading bay. These inaccuracies in the position of the trailer mean that the trailer may not be properly integrated into the environment map, which could cause autonomous mobile robots using the environment map within the trailer to inaccurately navigate within the trailer. Because the trailer is an environment with little room to maneuver, these inaccuracies may render the autonomous mobile robot unable to effectively load or unload the trailer.

Additionally, an autonomous mobile robot may use a pathfinding algorithm to navigate within an environment. Traditional pathfinding algorithms typically prioritize identifying a shortest or fastest path from an initial position to a new position. However, the shortest or fastest path may not be ideal for a robot operating within a trailer. For example, if the autonomous mobile robot is traveling to a spot near a side of the trailer, traditional pathfinding algorithms may generate a path that brings the autonomous mobile robot close to the sides of the trailer for a portion of the path. These paths can be problematic because the autonomous mobile robot then has less space to maneuver to manipulate an object or avoid an obstacle. Thus, traditional pathfinding algorithms fail to suffice for autonomous mobile robots operating in crowded or small environments such as trailers.

SUMMARY

To load and unload a trailer, an autonomous mobile robot determines its location and the location of objects within the trailer relative to the trailer itself, rather than relative to a warehouse. The autonomous mobile robot collects sensor data of the trailer when the robot reaches a docking point to which the trailer has docked. The autonomous mobile robot may determine characteristics of the trailer based on the sensor data, such as the width, height, depth, centerline, off-center parking, yaw, roll, or pitch of the trailer. The autonomous mobile robot determines its location relative to the trailer. For example, the autonomous mobile robot may determine its location relative to a centerpoint of the trailer or relative to some part of the trailer. The autonomous mobile robot may also determine the location of objects within the trailer relative to the trailer. The autonomous mobile robot then uses its location and the location of objects within the trailer to navigate within the trailer and manipulate objects within the trailer from the trailer's reference frame.

Additionally, the autonomous mobile robot uses a centerline heuristic to compute a path for itself within the trailer. The autonomous mobile robot uses sensor data to determine an initial pose for itself as well as an end pose for the robot within the trailer. The autonomous mobile robot computes a centerline for the trailer based on the sensor data and computes a path for itself from the initial pose to the end pose. The robot computes the path using a centerline heuristic, which is a heuristic that evaluates nodes within the trailer based on how far away those nodes are from the centerline. If the nodes are further away from the centerline, they are assigned a higher cost value than if they are closer to the centerline. Thus, when the autonomous mobile robot computes a path, the path is more likely to stay near the centerline of the trailer rather than get closer to the sides. Thus, when the autonomous mobile robot travels along the path to the end pose, the autonomous mobile robot generally has more clearance around itself, which improves its ability to navigate and manipulate objects within the trailer.

DETAILED DESCRIPTION

System Environment

Figure 1:
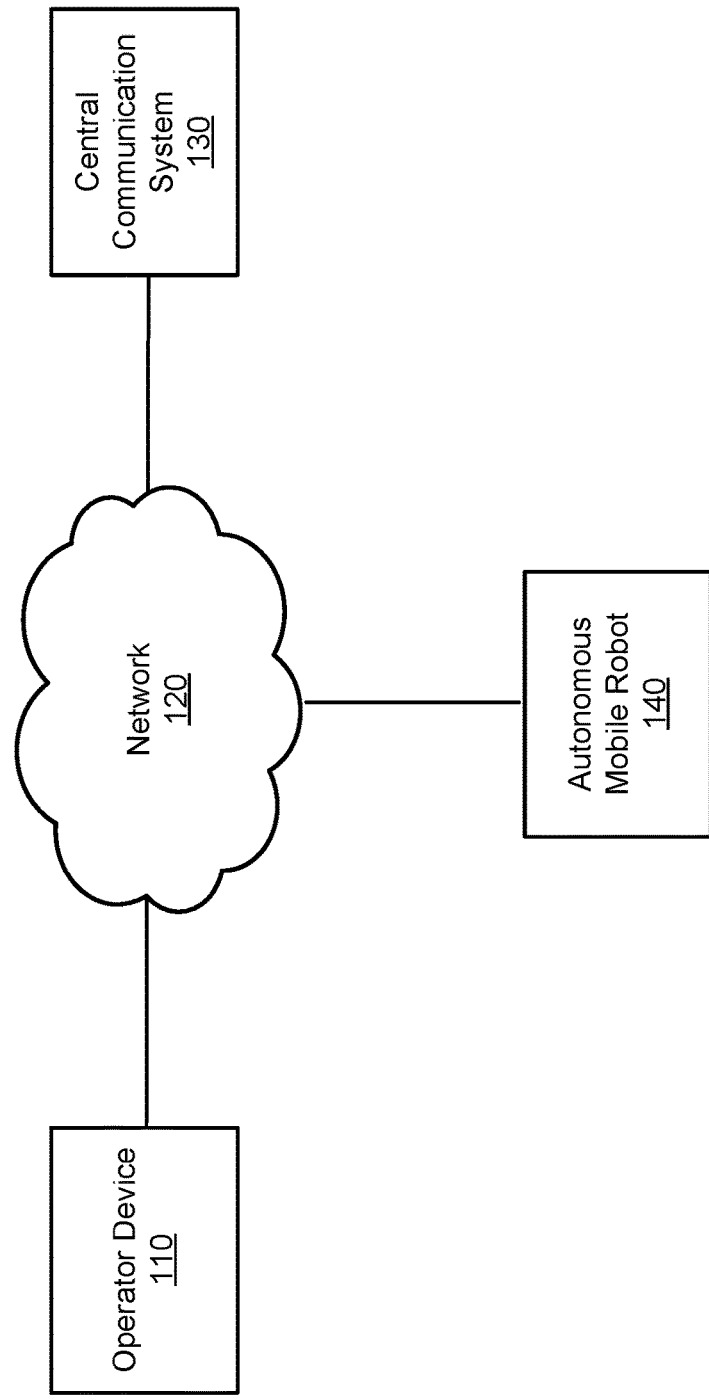
FIG. 1 illustrates an environment for operating an autonomous mobile robot using a central communication system, in accordance with some embodiments.

FIG. 1 illustrates an environment for operating an autonomous mobile robot using a central communication system, in accordance with some embodiments. Environment 100 includes operator device 110, network 120, central communication system 130, and autonomous mobile robot 140. Environment 100 may be generally described herein as a warehouse environment, however, environment 100 may be any kind of environment. Environment 100 need not be limited to a defined space (e.g., an interior of a warehouse), and may include any areas that are within the purview of instructions of an autonomous mobile robot (e.g., parking lots, loading docks, and so on that are outside of a warehouse space). While operator device 110 and central communication system 130 are depicted as being within environment 100, this is merely for convenience; these devices may be located outside of environment 100 (e.g., at a home, office, data center, cloud environment, etc.). Additional embodiments may include more, fewer, or different components from those illustrated in FIG. 1, and the functionality of each component may be divided between the components differently from the description below. Additionally, each component may perform their respective functionalities in response to a request from a human, or automatically without human intervention.

Operator device 110 may be any client device that interfaces one or more human operators with one or more autonomous mobile robots of environment 100 and/or central communication system 130. Exemplary client devices include smartphones, tablets, personal computers, kiosks, and so on. While only one operator device 110 is depicted, this is merely for convenience, and a human operator may use any number of operator devices to interface with autonomous mobile robots 140 or the central communication system 130. Operator device 110 may have a dedicated application installed thereon (e.g., downloaded from central communication system 130) for interfacing with the autonomous mobile robot 140 or the central communication system 130. Alternatively, or additionally, operator device 110 may access such an application by way of a browser. References to operator device 110 in the singular are done for convenience only, and equally apply to a plurality of operator devices.

Network 120 may be any network suitable for connecting operator device 110 with central communication system 130 and/or autonomous mobile robot 140. Exemplary networks may include a local area network, a wide area network, the Internet, an ad hoc network, and so on. In some embodiments, network 120 may be a closed network that is not connected to the Internet (e.g., to heighten security and prevent external parties from interacting with central communication system 130 and/or autonomous mobile robot 140). Such embodiments may be particularly advantageous where client device 110 is within the boundaries of environment 100.

Central communication system 130 acts as a central controller for a fleet of one or more robots including autonomous mobile robot 140. Central communication system 130 receives information from the fleet or the operator device 110 and uses that information to make decisions about activity to be performed by the fleet. Central communication system 130 may be installed on one device, or may be distributed across multiple devices. Central communication system 130 may be located within environment 100 or may be located outside of environment 100 (e.g., in a cloud implementation).

Autonomous mobile robot 140 may be any robot configured to act autonomously with respect to a command. For example, an autonomous mobile robot 140 may be commanded to move an object from a source area to a destination area, and may be configured to make decisions autonomously as to how to optimally perform this function (e.g., which side to lift the object from, which path to take, and so on). Autonomous mobile robot 140 may be any robot suitable for performing a commanded function. Exemplary autonomous mobile robots include vehicles, such as forklifts, mobile storage containers, etc. References to autonomous mobile robot 140 in the singular are made for convenience and are non-limiting; these references equally apply to scenarios including multiple autonomous mobile robots.

Exemplary Central Communication System Configuration

Figure 2:
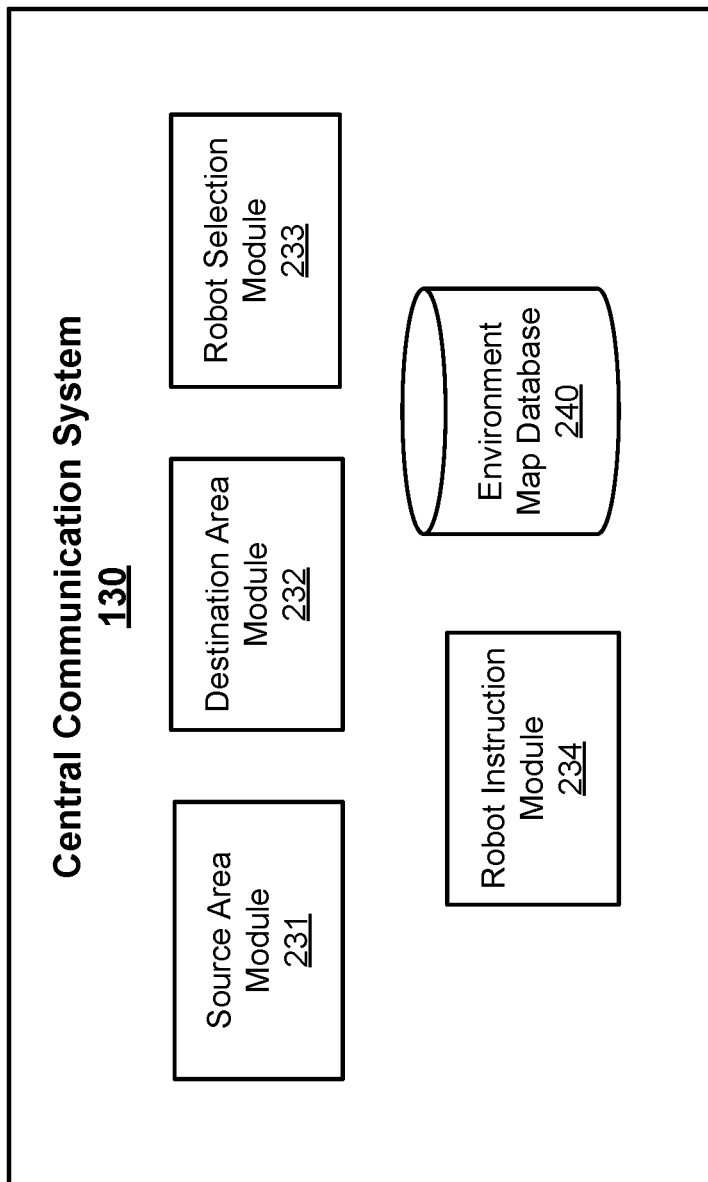
FIG. 2 illustrates exemplary modules and data stores used by a central communication system, in accordance with some embodiments.

FIG. 2 illustrates exemplary modules and data stores used by the central communication system 130, in accordance with some embodiments. The central communication system 130 may include a source area module 231, a destination area module 232, a robot selection module 233, and a robot instruction module 234, as well as an environment map database 240. The modules and databases depicted in FIG. 2 are merely exemplary; fewer or more modules and/or databases may be used by central communication system 130 to achieve the functionality disclosed herein. Additionally, the functionality of each component may be divided between the components differently from the description below. Additionally, each component may perform their respective functionalities in response to a request from a human, or automatically without human intervention.

The source area module 231 identifies a source area. The term source area, as used herein, may refer to either a single point, several points, or a region surrounded by a boundary (sometimes referred to herein as a source boundary) within which a robot is to manipulate objects (e.g., pick up objects for transfer to another area). In an embodiment, the source area module 231 receives input from operator device 110 that defines the point(s) and/or region that form the source area. In an embodiment, the source area module 231 may receive input from one or more robots (e.g., image and/or depth sensor information showing objects known to need to be moved (e.g., within a predefined load dock)), and may automatically determine a source area to include a region within a boundary that surrounds the detected objects. The source area may change dynamically as objects are manipulated (e.g., the source area module 232 may shrink the size of the source area by moving boundaries inward as objects are transported out of the source area, and/or may increase the size of the source area by moving boundaries outward as new objects are detected).

The destination area module 232 identifies a destination area. The term destination area, as used herein, may refer to either a single point, several points, or a region surrounded by a boundary (sometimes referred to herein as a destination boundary) within which a robot is to manipulate objects (e.g., drop an object off to rest). For example, where the objects are pallets in a warehouse setting, the destination area may include several pallet stands at different points in the facility, any of which may be used to drop off a pallet. The destination area module 232 may identify the destination area in any manner described above with respect to a source area, and may also identify the destination area using additional means.

The destination area module 232 may determine the destination area based on information about the source area and/or the objects to be transported. Objects in the source area may have certain associated rules that add constraints to the destination area. For example, there may be a requirement that the objects be placed in a space having a predefined property (e.g., a pallet must be placed on a pallet stand, and thus the destination area must have a pallet stand for each pallet to be moved). As another example, there may be a requirement that the objects be placed at least a threshold distance away from the destination area boundary, and thus, destination area module 232 may require a human draw the boundary at least at this distance and/or may populate the destination boundary automatically according to this rule (and thus, the boundary must be drawn at least that distance away). Yet further, destination area module 232 may require that the volume of the destination area is at least large enough to accommodate all of the objects to be transported that are initially within the source area.

Source area module 231 and destination area module 232 may, in addition to, or alternative to, using rules to determine their respective boundaries, may use machine learning models to determine their respective boundaries. The models may be trained to take information as input, such as some or all of the above-mentioned constraints, sensory data, map data, object detection data, and so on, and to output boundaries based thereon. The models may be trained using data on tasks assigned to robots in the past, such as data on how operators have defined or refined the tasks based on various parameters and constraints.

Robot selection module 233 selects one or more robots that are to transport objects from the source area to the destination area. In an embodiment, robot selection module 233 performs this selection based on one or more of a manipulation capability of the robots and a location of the robots within the facility. The term manipulation capability, as used herein, refers to a robot's ability to perform a task related to manipulation of an object. For example, if an object must be lifted, the robot must have the manipulation capability to lift objects, to lift an object having at least the weight of the given object to be lifted, and so on. Other manipulation capabilities may include an ability to push an object, an ability to drive an object (e.g., a mechanical arm may have an ability to lift an object, but may be unable to drive an object because it is affixed to, e.g., the ground), and so on. Further manipulation capabilities may include lifting and then transporting objects, hooking and then towing objects, tunneling and then transporting objects, using robots in combination with one another (e.g., an arm or other manipulates an object (e.g., lifts), places on another robot, and the robot then drives to the destination with the object). These examples are merely exemplary and non-exhaustive. Robot selection module 233 may determine required manipulation capabilities to manipulate the object(s) at issue, and may select one or more robots that satisfy those manipulation capabilities.

In terms of location, robot selection module 233 may select one or more robots based on their location to the source area and/or the destination area. For example, robot selection module 233 may determine one or more robots that are closest to the source area, and may select those robot(s) to manipulate the object(s) in the source area. Robot selection module 233 may select the robot(s) based on additional factors, such as a number of objects to be manipulated, manipulation capabilities of the robot (e.g., how many objects can the robot carry at once; sensors the robot is equipped with; etc.), motion capabilities of the robot, and so on. In an embodiment, robot selection module 233 may select robots based on a state of one or more robot's battery (e.g., a closer robot may be passed up for a further robot because the closer robot has insufficient battery to complete the task). In an embodiment, robot selection module 233 may select robots based on their internal health status (e.g., where a robot is reporting an internal temperature close to overheating, that robot may be passed up even if it otherwise optimal, to allow that robot to cool down). Other internal health status parameters may include battery or fuel levels, maintenance status, and so on. Yet further factors may include future orders, a scheduling strategy that incorporates a longer horizon window (e.g., a robot that is optimal to be used now may, if used now, result in inefficiencies (e.g., depleted battery level or sub-optimal location), given a future task for that robot), a scheduling strategy that incorporates external processes, a scheduling strategy that results from information exchanged between higher level systems (e.g., WMS, ERP, EMS, etc.), and so on.

The robot selection module 233 may select a robot using machine learning model trained to take various parameters as input, and to output one or more robots best suited to the task. The inputs may include available robots, their manipulation capabilities, their locations, their state of health, their availability, task parameters, scheduling parameters, map information, and/or any other mentioned attributes of robots and/or tasks. The outputs may include an identification of one or more robots to be used (or suitable to be used) to execute a task. The robot selection module 233 may automatically select one or more of the identified robots for executing a task, or may prompt a user of operator device 110 to select from the identified one or more robots.

The robot instruction module 234 transmits instructions to the selected one or more robots to manipulate the object(s) in the source area (e.g., to ultimately transport the object(s) to the destination area). In an embodiment, the robot instruction module 234 includes detailed step-by-step instructions on how to transport the objects. In another embodiment, the robot instruction module 234 transmits a general instruction to transmit one or more objects from the source area to the destination area, leaving the manner in which the objects will be manipulated and ultimately transmitted up to the robot to determine autonomously.

The robot instruction module 234 may transmit instructions to a robot to traverse from a start pose to an end pose. In some embodiments, the robot instruction module 234 simply transmits a start pose and end pose to the robot and the robot determines a path from the start pose to the end pose. Alternatively, the robot instruction module 234 may provide some information on a path the robot should take to travel from the start pose to the end pose. Robot pathfinding is discussed in more detail below.

Environment map database 240 stores information about the environment of the autonomous mobile robot 140. The environment of an autonomous mobile robot 140 is the area within which the autonomous mobile robot 140 operates. For example, the environment may be a facility or a parking lot within which the autonomous mobile robot 140 operates. In some embodiments, the environment map database 240 stores environment information in one or more maps representative of the environment. The maps may be two-dimensional, three dimensional, or a combination of both. Central communication facility 130 may receive a map from operator device 110, or may generate one based on input received from one or more robots 140 (e.g., by stitching together images and/or depth information received from the robots as they traverse the facility, and optionally stitching in semantic, instance, and/or other sensor-derived information into corresponding portions of the map). In some embodiments, the map stored by the environment map database 240 indicates the locations of obstacles within the environment. The map may include information about each obstacle, such as whether the obstacle is an animate or inanimate object.

Environment map database 240 may be updated by central communication facility 130 based on information received from the operator device 110 or from the robots 140. Information may include images, depth information, auxiliary information, semantic information, instance information, and any other information described herein. The environment information may include information about objects within the facility, obstacles within the facility, and auxiliary information describing activity in the facility. Auxiliary information may include traffic information (e.g., a rate at which humans and/or robots access a given path or area within the facility), information about the robots within the facility (e.g., manipulation capability, location, etc.), time-of-day information (e.g., traffic as it is expected during different segments of the day), and so on.

The central communication facility 130 may continuously update environment information stored by the environment map database 240 as such information is received (e.g., to show a change in traffic patterns on a given path). The central communication facility 130 may also update environment information responsive to input received from the operator device 110 (e.g., manually inputting an indication of a change in traffic pattern, an area where humans and/or robots are prohibited, an indication of a new obstacle, and so on).

Exemplary Autonomous Mobile Robot Configuration

Figure 3:
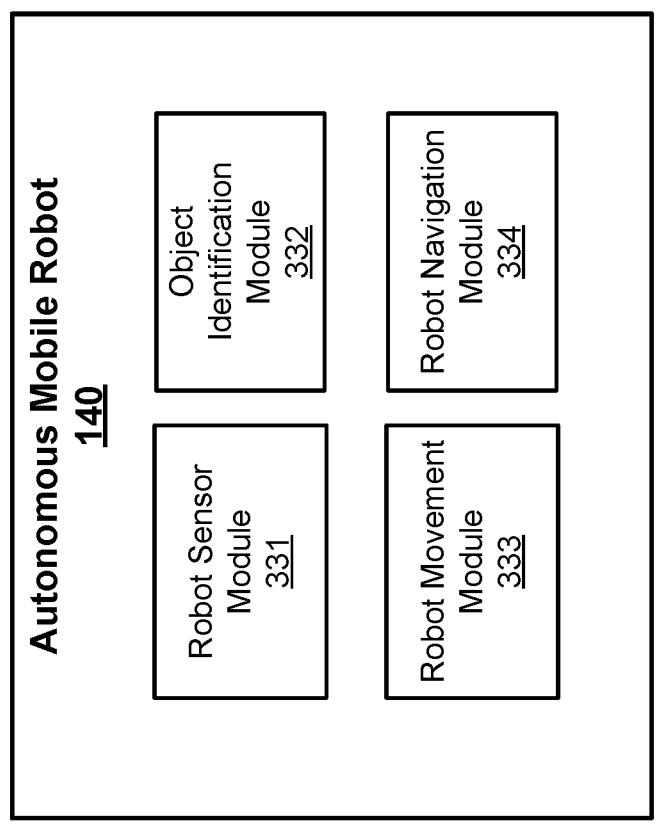
FIG. 3 illustrates exemplary modules and data stores used by the autonomous mobile robot, in accordance with some embodiments.

FIG. 3 illustrates exemplary modules and data stores used by the autonomous mobile robot, in accordance with some embodiments. As depicted in FIG. 3, autonomous mobile robot 140 includes a robot sensor module 331, an object identification module 332, a robot movement module 337, and a robot navigation module 334. The modules and databases depicted in FIG. 3 are merely exemplary; fewer or more modules and/or databases may be used to achieve the functionality described herein. Furthermore, any of the described functionality of the modules may instead be performed by the central communication system 130 or the operator device 110. Additionally, any of the functionality of these modules may be performed with or without human instruction.

The robot sensor module 331 includes a number of sensors that the robot uses to collect data about the robot's surroundings. For example, the robot sensor module 331 may include one or more cameras, one or more depth sensors, one or more scan sensors (e.g., RFID), a location sensor (e.g., showing location of the robot within the facility and/or GPS coordinates), and so on. Additionally, the robot sensor module 331 may include software elements for preprocessing sensor data for use by the robot. For example, the robot sensor module 331 may generate depth data information based on LIDAR sensor data. Data collected by the robot sensor module 331 may be used by the object identification module 332 to identify obstacles around the robot or may be used to determine a pose into which the robot must travel to reach an end pose.

The object identification module 332 ingests information received from the robot sensor module 331, and outputs information that identifies an object in proximity to the robot. The object identification module 332 may utilize information from a map of the facility (e.g., as retrieved from environment map database 240) in addition to information from the robot sensor module 331 in identifying the object. For example, the object identification module 332 may utilize location information, semantic information, instance information, and so on to identify the object.

Additionally, the object identification module 332 identifies obstacles around the robot for the robot to avoid. For example, the object identification module 332 determines whether an obstacle is an inanimate obstacle (e.g., a box, a plant, or a column) or an animate object (e.g., a person or an animal). The object identification module 332 may use information from the environment map database 240 to determine where obstacles are within the robot's environment. Similarly, the object identification module 332 may use information from the robot sensor module 331 to identify obstacles around the robot.

The robot movement module 333 transports the robot within its environment. For example, the robot movement module 333 may include a motor, wheels, tracks, and/or legs for moving. The robot movement module 333 may include components that the robot uses to move from one pose to another pose. For example, the robot may use components in the robot movement module 333 to change its x-, y-, or z-coordinates or to change its orientation. In some embodiments, the robot movement module 333 receives instructions from the robot navigation module 334 to follow a path determined by the robot navigation module 334 and performs the necessary actions to transport the robot along the determined path.

The robot navigation module 334 determines a path for the robot from a start pose to an end pose within the environment. A pose of the robot may refer to an orientation of the robot and/or a location of the robot (including x-, y-, and z-coordinates). The start pose may be the robot's current pose or some other pose within the environment. The end pose may be an ultimate pose within the environment to which the robot is traveling or may be an intermediate pose between the ultimate pose and the start pose. The path may include a series of instructions for the robot to perform to reach the goal pose. For example, the path may include instructions for the robot to travel from one x-, y-, or z-coordinate to another and/or to adjust the robot's orientation (e.g., by taking a turn or by rotating in place). In some embodiments, the robot navigation module 334 implements routing instructions received by the robot from the central communication system 130. For example, the central communication system 130 may transmit an end pose to the robot navigation module 334 or a general path for the robot to take to a goal pose, and the robot navigation module 334 may determine a path that avoids objects, obstacles, or people within the environment. The robot navigation module 334 may determine a path for the robot based on sensor data or based on environment data. In some embodiments, the robot navigation module 334 updates an already determined path based on new data received by the robot.

In some embodiments, the robot navigation module 334 receives an end location and the robot navigation module 334 determines an orientation of the robot necessary to perform a task at the end location. For example, the robot may receive an end location and an instruction to deliver an object at the end location, and the robot navigation module 334 may determine an orientation that the robot must take to properly deliver the object at the end location. The robot navigation module 334 may determine a necessary orientation at the end location based on information captured by the robot sensor module 331, information stored by the environment map database 240, or based on instructions received from an operator device. In some embodiments, the robot navigation module 334 uses the end location and the determined orientation at the end location to determine the end pose for the robot.

Example Automated Trailer Loading and Unloading

Figure 4:
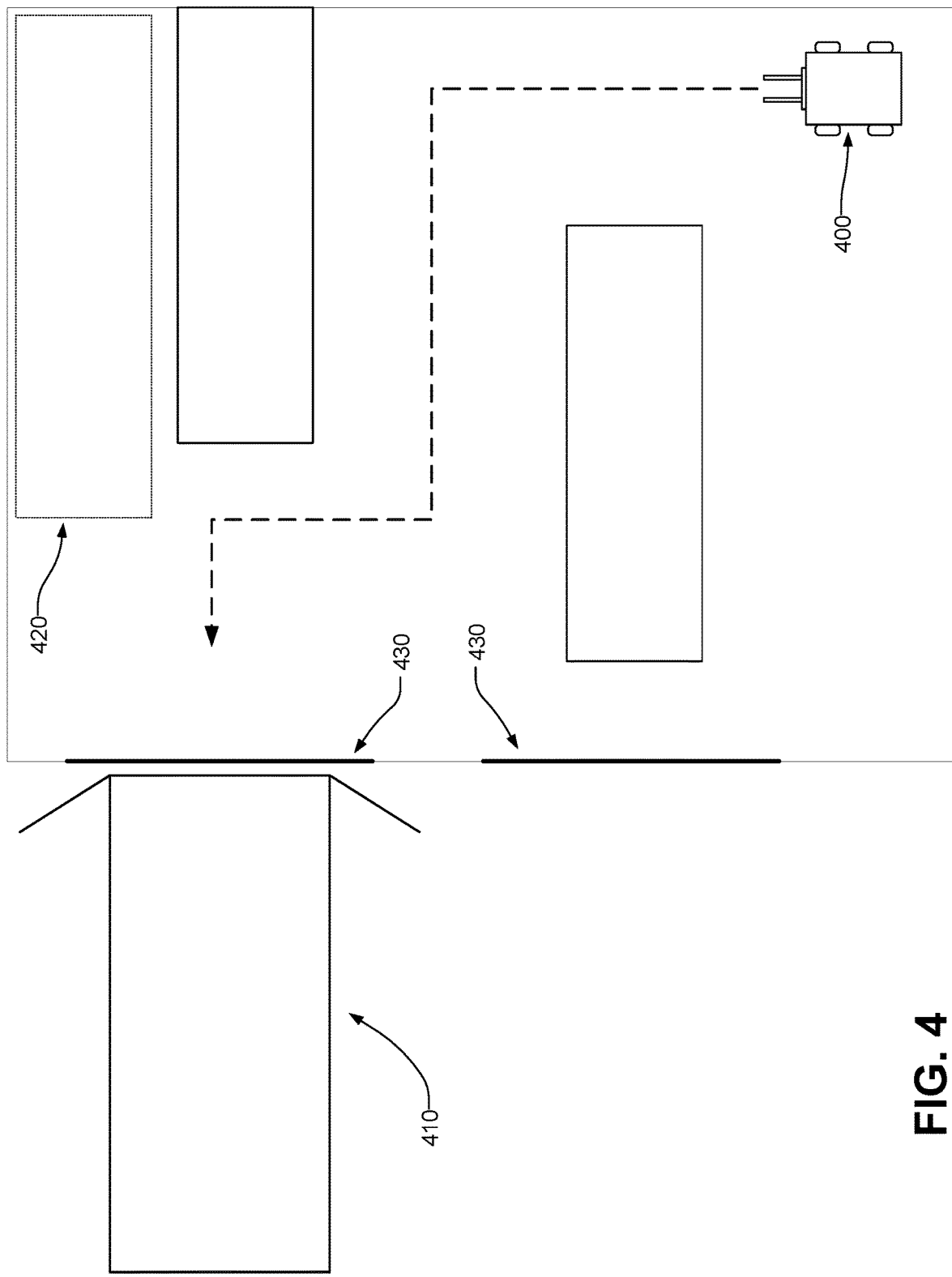
FIG. 4 illustrates an example autonomous mobile robot navigating through a warehouse environment to a trailer, in accordance with some embodiments.

FIG. 4 illustrates an example autonomous mobile robot 400 navigating through a warehouse environment to a trailer 410, in accordance with some embodiments. The autonomous mobile robot 400 may have been instructed by a central communication system to load or unload the trailer 410. The central communication system also may have specified an area 420 to which autonomous mobile robot 400 may unload objects from the trailer 410 or from which the autonomous mobile robot 400 may obtain objects to load into the trailer 410. The central communication system may also specify which of a set docking points 430 the trailer 410 has docked to.

When the autonomous mobile robot reaches the docking point, the autonomous mobile robot may use sensor data to collect information about the trailer. The sensor data is data collected by one or more sensors on the autonomous mobile robot. For example, the sensor data may include LIDAR data captured by a LIDAR sensor and/or image data captured by a camera. In some embodiments, the sensor data includes data that describes the locations of objects and obstacles around the autonomous mobile robot in a two-dimensional space and/or a three-dimensional space. The autonomous mobile robot may determine characteristics of the trailer based on the sensor data. For example, the autonomous mobile robot may determine the width, height, depth, centerline, off-center parking, yaw, roll, and/or pitch of the trailer.

Additionally, the autonomous mobile robot may determine its location relative to the trailer based on the sensor data. For example, the autonomous mobile robot may identify some point or part of the trailer and determine its location with respect to that point or part. The autonomous mobile robot may use the sensor data determine its location and orientation relative the trailer. Furthermore, the autonomous mobile robot may identify objects in the trailer and may determine poses of the objects. For example, the autonomous mobile robot may identify pallets, including the types of the pallets, and may determine their location and orientation within the trailer. In some embodiments, the autonomous mobile robot continually determines its location, and the locations of objects and obstacles, based on continually received sensor data. The autonomous mobile robot may continually receive sensor data on a regular or irregular basis.

In some embodiments, the autonomous mobile robot uses a machine-learning model (e.g., a neural network) to determine characteristics of the trailer based on sensor data. For example, the machine-learning model may be a computer-vision model that has been trained to determine characteristics of a trailer based on image data captured by a camera on the autonomous mobile robot. Similarly, the machine-learning model may be trained to determine the location and orientation of objects within the trailer based on sensor data.

The autonomous mobile robot may enter the trailer and use sensor data of the trailer to determine the autonomous mobile robot's location with respect to the trailer. Additionally, the autonomous mobile robot may determine the location of the objects in the trailer, and any obstacles in the trailer, with respect to the trailer based on the sensor data. The autonomous mobile robot identifies an object to unload from the trailer and manipulates the object using a forklift component. In some embodiments, while the autonomous mobile robot navigates within the trailer, the autonomous mobile robot travels slightly offset from a centerline of the trailer so that the autonomous mobile robot is more likely to be in a correct position to manipulate an object within the trailer. In these embodiments, by remaining slightly offset from the centerline of the trailer, the autonomous mobile robot will likely be able to position its forks to lift an object by simply side-shifting its forks.

In some embodiments, the autonomous mobile robot uses an enhanced navigation algorithm while navigating within the trailer. An enhanced navigation algorithm may enable the autonomous mobile robot to determine its location more accurately within the trailer and to determine more accurately the locations of objects and obstacles within the trailer. The enhanced navigation algorithm may be more precise than a navigation algorithm used by the autonomous mobile robot while the autonomous mobile robot navigates within the warehouse environment. In some embodiments, the enhanced navigation algorithm uses a map within the trailer that has a finer resolution than the environment map. Similarly, the enhanced navigation algorithm may use denser motion primitives to navigate within the trailer than a navigation algorithm used by the autonomous mobile robot when navigating within the warehouse environment. In some embodiments, the enhanced navigation algorithm uses a modified version of A* search to navigate within the trailer. Furthermore, the enhanced navigation algorithm may use sensor data with a narrower field of view than the sensor data used a navigation algorithm used while the autonomous mobile robot navigates within the warehouse environment.

The autonomous mobile robot may detect when it has entered the trailer and may start using an enhanced navigation algorithm upon determining that it has entered the trailer. The autonomous mobile robot may use the enhanced navigation algorithm to position itself to manipulate objects within the trailer and to transport an object out of the trailer. Furthermore, the autonomous mobile robot may detect when it has exited the trailer and stop using an enhanced navigation algorithm upon determining that it is no longer in the trailer.

In some embodiments, the autonomous mobile robot uses a first navigation algorithm to determine a route from a first pose in the warehouse environment to a second pose near an entrance to the trailer. The autonomous mobile robot may then use a second navigation algorithm to determine a route from the second pose to a third pose within the trailer from which the autonomous mobile robot can manipulate an object. The first navigation algorithm may be a navigation algorithm that the autonomous mobile robot uses to navigate within the warehouse environment and the second navigation algorithm may be an enhanced navigation algorithm that the autonomous mobile robot uses to determine its location within the trailer. Thus, the second navigation algorithm may be a navigation algorithm with a higher level of precision than the first navigation algorithm. For example, the second navigation algorithm may use a map with a finer resolution or may use more precise or dense motion primitives to determine a route.

Figure 5A:
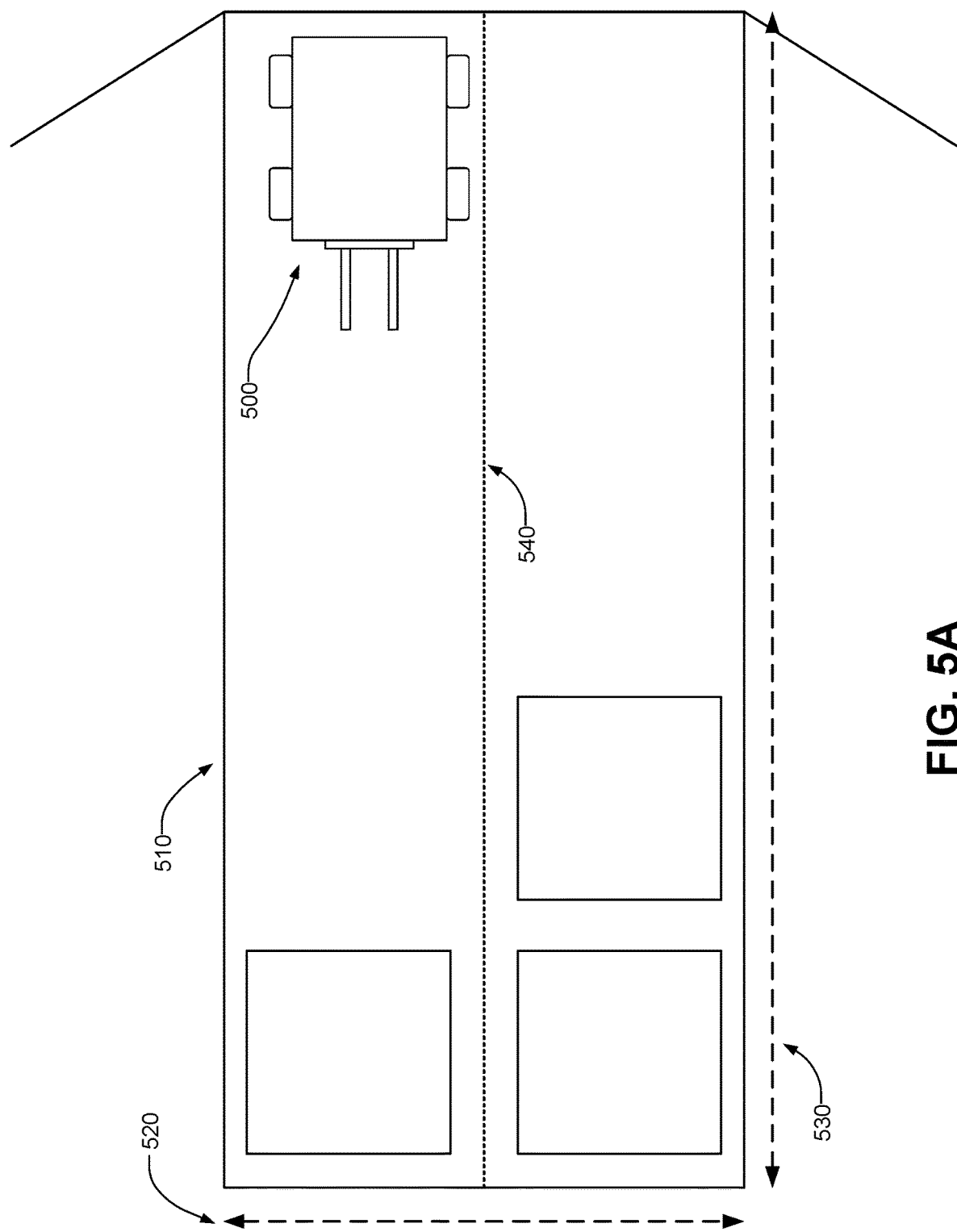
FIG. 5A illustrates example characteristics that the autonomous mobile robot may determine based on sensor data, in accordance with some embodiments.
Figure 5B:
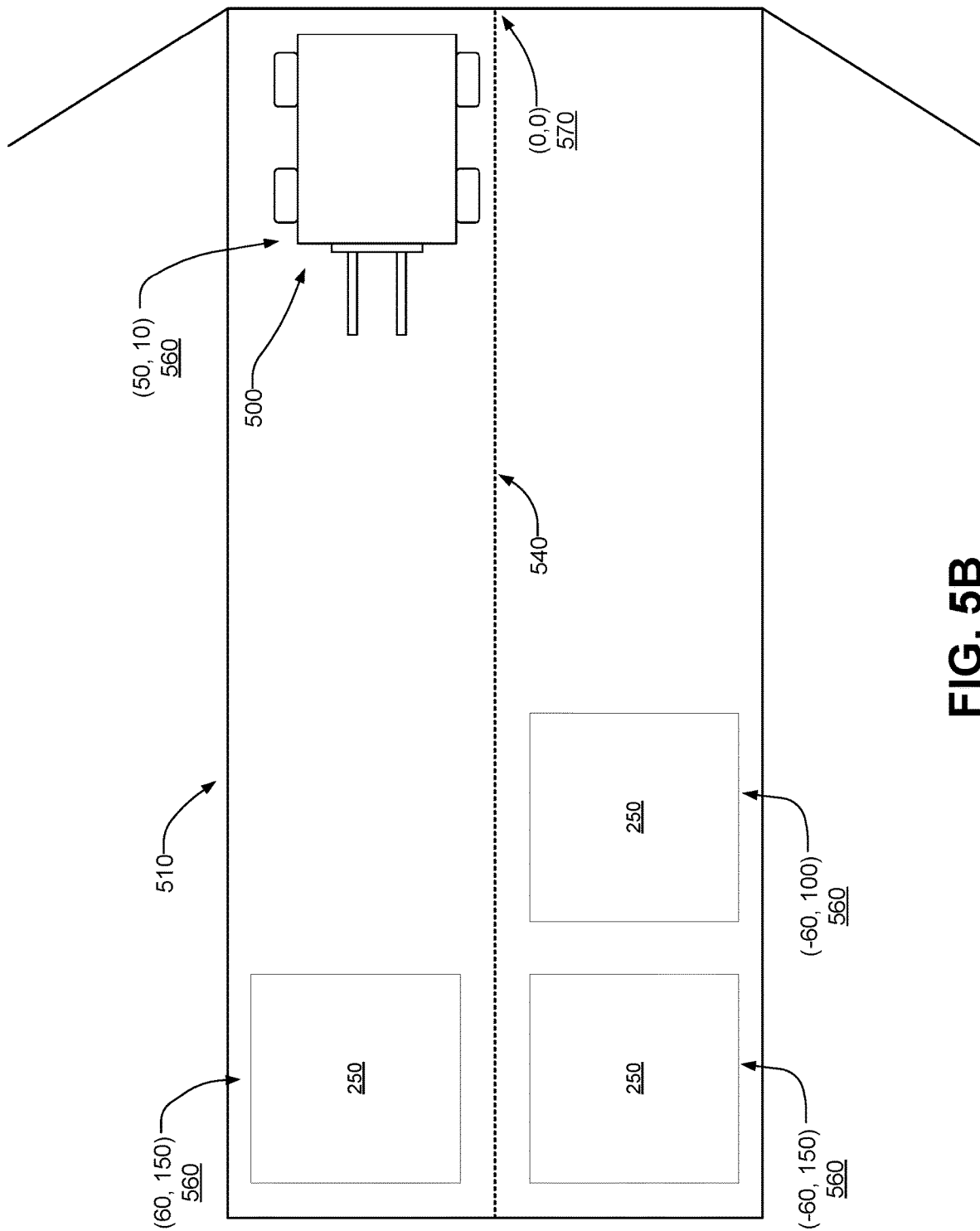
FIG. 5B illustrates example locations of the autonomous mobile robot and objects within the trailer, as determined by the autonomous mobile robot, in accordance with some embodiments.

FIGS. 5A and 5B illustrate an example autonomous mobile robot 500 navigating within a trailer 510 and determining characteristics of the trailer 510, in accordance with some embodiments. FIG. 5A illustrates example characteristics that the autonomous mobile robot 500 may determine based on sensor data. For example, the autonomous mobile robot 500 may determine a width 520 and a depth 530 of the trailer 510. Additionally, the autonomous mobile robot 20 may determine the location of a centerline 540 of the trailer 510.

FIG. 5B illustrates example locations 560 of the autonomous mobile robot 500 and objects 550 within the trailer 510, as determined by the autonomous mobile robot 500. The autonomous mobile robot 500 determines the locations 560 of itself and objects 550 relative to the trailer 510. In the embodiment illustrated in FIG. 5B, the locations 560 of the autonomous mobile robot 500 and the objects 550 are determined relative to an origin location 570, however alternative embodiments may determine locations 560 within the trailer 510 relative to any part of the trailer 510.

The autonomous mobile robot generally must unload the last row of the trailer first. In some embodiments, the autonomous mobile robot determines whether the trailer is full and, responsive to determining that the trailer is full, determines that it must unload the last row of the trailer. As used herein, the last row of the trailer is the row that is closest to the doors through which the autonomous mobile robot enters to load or unload the trailer. When the autonomous mobile robot prepares to unload the last row of the trailer, the autonomous mobile robot generally must manipulate the objects in the last row from a ramp that connects the warehouse to the trailer. Therefore, the autonomous mobile robot accounts for the angle of the ramp while approaching the objects.

The autonomous mobile robot uses sensor data to monitor its location relative to the object. Additionally, the autonomous mobile robot may use accelerometer or gyroscopic data to determine its orientation on the ramp and to thereby adjust the orientation of a forklift component coupled to the autonomous mobile robot. The autonomous mobile robot adjusts its forklift components to ensure that the forks are level with respect to the floor of the trailer, rather than the ramp. The autonomous mobile robot thereby ensures that the forks are in the correct orientation to manipulate a pallet. The robot may continually adjust its forks as it approaches the object. For example, the autonomous mobile robot may continually gather new sensor data about its surroundings to continually determine its location and pose with respect to an object in the last row of the trailer and continually adjust its forklift component.

Figure 6A:
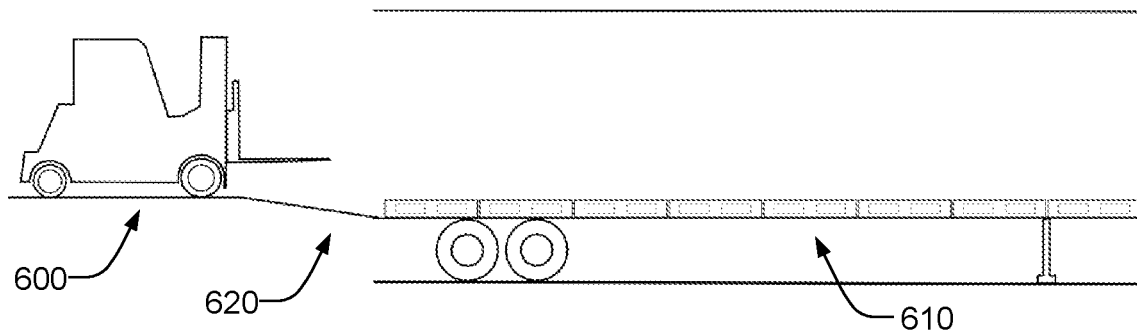
FIG. 6A illustrates an autonomous mobile robot approaching a ramp that leads from the warehouse to the trailer, in accordance with some embodiments.
Figure 6B:
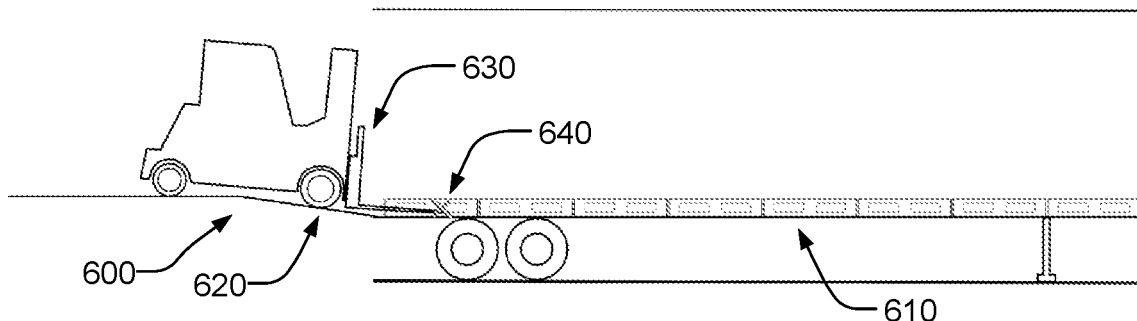
FIG. 6B illustrates an autonomous mobile robot attempting to unload an object in the last row of the trailer without adjusting its forklift, in accordance with some embodiments.
Figure 6C:
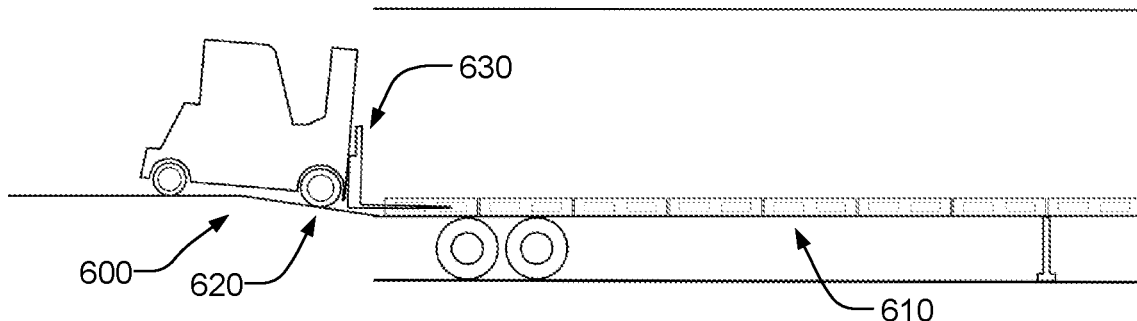
FIG. 6C illustrates an autonomous mobile robot that adjusts its forklift to be level with the floor of the trailer, in accordance with some embodiments.

FIGS. 6A-6C illustrate an example autonomous mobile robot 600 unloading objects in the last row of a trailer 610, in accordance with some embodiments. FIG. 6A illustrates an autonomous mobile robot 600 approaching a ramp 620 that leads from the warehouse to the trailer 610. FIG. 6B illustrates an autonomous mobile robot 600 attempting to unload an object in the last row of the trailer 610 without adjusting its forklift 630. The forklift 630 remains level with respect to the ramp 620, meaning that the forks of the forklift 630 would collide 640 with the floor of the trailer 610. FIG. 6C illustrates an autonomous mobile robot 600 that adjusts its forklift 630 to be level with the floor of the trailer 610. By continually adjusting its forklift 630 as it travels down the ramp 620, the autonomous mobile robot 600 ensures that its forklift 630 is able to manipulate an object in the last row of the trailer 610 without having to maneuver itself significantly.

While performing an unload mission, the autonomous mobile robot continues to unload objects from a trailer to a destination area within the warehouse until the trailer is empty. In some embodiments, the autonomous mobile robot determines that the trailer is empty by navigating to the trailer, collecting sensor data of the interior of the trailer, and determining that there are no more objects in the trailer.

In some embodiments, the autonomous mobile robot continues to determine its location with respect to environment map of the warehouse while also determining its location with respect to the trailer. The autonomous mobile robot may use its location with respect to the trailer for navigating within the trailer. However, by continuing to track its location with respect to the environment map, the autonomous mobile robot can more quickly return to navigating with respect to the environment map.

To continue to determine its location with respect to the environment map while navigating within the trailer, the autonomous mobile robot may determine the location of the trailer with respect to the warehouse. For example, the autonomous mobile robot may capture images of the entrance of the trailer and/or of the entire exterior of the trailer. The autonomous mobile robot may then determine the location of the trailer with respect to the warehouse based on these captured images. The autonomous mobile robot may then continue to determine its location with respect to the environment map based on the determined location of the trailer with respect to the warehouse. The autonomous mobile robot performs a mission to load a trailer in a similar manner to how the autonomous mobile robot unloads a trailer. In some embodiments, the autonomous mobile robot performs an "empty run" of the trailer, where the autonomous mobile robot travels into a trailer that is to be loaded to collect sensor data and determine characteristics of the trailer. The autonomous mobile robot may perform this "empty run" without carrying any objects from a source area.

To load the trailer, the autonomous mobile robot identifies an object in a source area to load onto the trailer. The autonomous mobile robot picks up the object and navigates from the source area to the trailer. The autonomous mobile robot determines whether the object needs to be loaded in the last row of the trailer. If the object does not need to be placed in the last row of the trailer, the autonomous mobile robot enters the trailer and identifies a location in the trailer where the object will be placed. In some embodiments, the autonomous mobile robot travels within the trailer slightly offset from a centerline of the trailer so that the autonomous mobile robot is more likely to be in a correct pose to deliver the object to a proper location within the trailer.

If the object needs to be placed in the last row of the trailer, the autonomous mobile robot will continually collect sensor data to determine a correct orientation of its forklift such that the object is delivered level with the floor of the trailer. The autonomous mobile robot continually adjusts the orientation of its forklift until the autonomous mobile robot delivers the object to a proper spot in the last row of the trailer.

The autonomous mobile robot may include components that enable the autonomous mobile robot to navigate within the trailer. For example, the autonomous mobile robot may include a movement system that enables the autonomous mobile robot to rotate in place. Similarly, the autonomous mobile robot may be configured to move to perpendicularly to the direction it is facing without changing its orientation. Thus, the autonomous mobile robot is capable of navigating within often narrow spaces within a trailer and to position itself to be able to manipulate objects within the trailer.

Furthermore, the autonomous mobile robot may include components that enable the autonomous mobile robot to manipulate objects within the trailer. For example, the autonomous mobile robot may include a forklift with the ability to side-shift. Thus, the autonomous mobile robot can position the forklift to manipulate objects without having to reposition itself. The autonomous mobile robot may also include an arm that can lift objects while the autonomous mobile robot maintains a fixed pose. Thus, the autonomous mobile robot can effectively manipulate objects within the trailer from the often limited poses available within the trailer.

Example Centerline Heuristic-Based Path Finding

Figure 7:
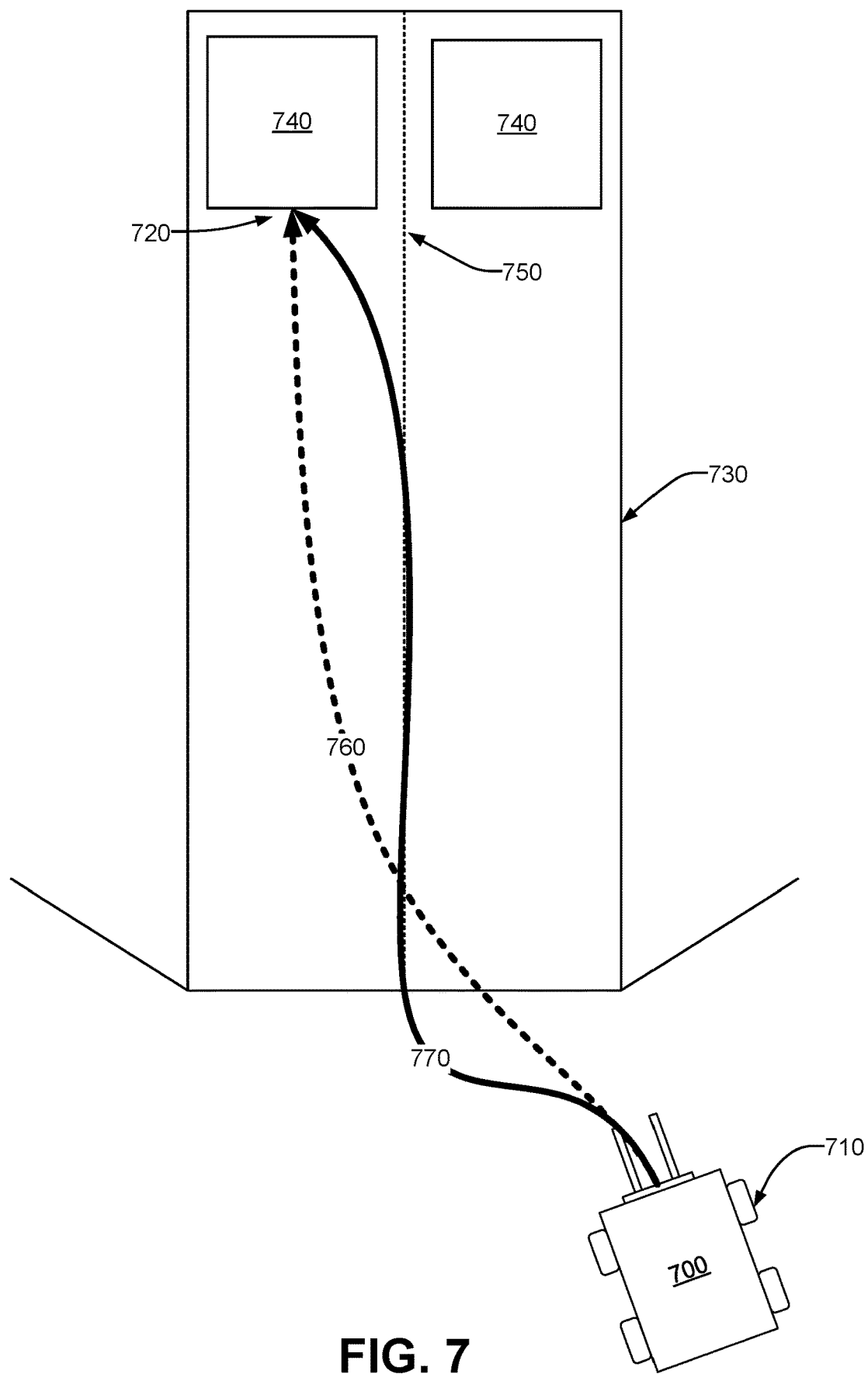
FIG. 7 illustrates an example autonomous mobile robot that uses a centerline heuristic to navigate within a trailer, in accordance with some embodiments.

FIG. 7 illustrates an example autonomous mobile robot that uses a centerline heuristic to navigate within a trailer, in accordance with some embodiments. While the FIG. 7 illustrates an autonomous mobile robot entering a trailer, a similar process may be used for an autonomous mobile robot exiting the trailer, as well.

The autonomous mobile robot 700 receives sensor data describing the environment around the robot. The autonomous mobile robot 700 may receive the sensor data from sensors coupled to the robot (e.g., the robot sensor module 331) or from sensors remote from the autonomous mobile robot.

The autonomous mobile robot 700 determines an initial pose 710 of the autonomous mobile robot 700 and an end pose 720 for the autonomous mobile robot 700 based on the received sensor data. The initial pose 710 of the autonomous mobile robot 700 may be a current pose of the autonomous mobile robot, or a pose near the entrance of a trailer 730. The end pose 720 may be a pose for handling an object 740 (e.g., an item on a pallet) within the trailer 730. In some embodiments, the autonomous mobile robot 700 determines the end pose based on instructions from a central communications system.

The autonomous mobile robot 700 computes a centerline 750 of the trailer 730 based on the received sensor data. The centerline is a centerline of the trailer (i.e., is a line that is equidistant from the sides of the trailer). In some embodiments, the autonomous mobile robot 700 generates a map of the interior of the trailer based on the sensor data and computes the centerline based on the generated map.

FIG. 7 illustrates an example path 760 from the initial pose 710 to the end pose 720 that is computed without a centerline heuristic. The autonomous mobile robot may compute the path 760 using a pathfinding algorithm, such as Hybrid A* or State Lattice Planner. A pathfinding algorithm may use heuristics to compute a path from a first pose to a second pose. For example, a pathfinding algorithm may use a heuristic to represent a cost of a set of nodes through which the autonomous mobile robot 700 may pass as part of the path. These nodes may be coordinates or locations within the trailer through which the robot may pass as part of a computed path. The heuristic may have a higher cost for a "worse" node than for a "better" node. For example, a common heuristic is the distance from a node to the end pose, and the heuristic may thereby compute a higher cost (i.e., distance) for a node that is further away from the end pose than a node that is closer to the end pose. The pathfinding algorithms compute a path through nodes that minimize the total cost of the nodes that the path passes through.

As illustrated in FIG. 7, a path 760 that uses traditional heuristics is likely to take a more direct path to the end pose 720. While this may mean that the autonomous mobile robot 700 takes a shorter path, the path 760 may take the autonomous mobile robot 700 closer to the sides of the trailer 730, especially if the end pose 720 is closer to one side of the trailer 730 than the other. This may reduce the space that the autonomous mobile robot 700 has to maneuver if the autonomous mobile robot 700 has to change course within the trailer 730.

FIG. 7 illustrates a path 770 computed using a centerline heuristic. A centerline heuristic is a heuristic that represents a distance of nodes to the centerline 750. For example, the centerline heuristic may increase the cost of a node that is further from the centerline 750 relative to a node that is closer to the centerline 750. In some embodiments, the centerline heuristic assigns a cost value to a node that is proportional to the distance of the node to the centerline of the trailer. Alternatively, the centerline heuristic may assign a constant cost value to nodes within some threshold distance of the centerline, and may assign cost values to other nodes that is proportion to their distance from the centerline minus the threshold distance. In other words, the centerline heuristic may assign cost values to nodes such that nodes within some area (e.g., a rectangular area) around the centerline are constant, and that nodes outside the area are assigned cost values that are proportional to their distance from the area.

The autonomous mobile robot 700 may use a combination of multiple heuristics to compute the path 770 to the end pose 720. For example, the autonomous mobile robot 700 may compute a combination of the centerline heuristic, a heuristic representing a distance of a node to the end pose 720, and a heuristic representing a distance of a node to an obstacle. Thus, the autonomous mobile robot 700 may compute a combined cost for each node that is a function (e.g., a linear combination) of multiple heuristics.

As explained above, the autonomous mobile robot 700 computes the path 770 from the initial pose 710 to the end pose 720 based on the centerline heuristic. The autonomous mobile robot 700 travels along the path 770 to the end pose 720. The autonomous mobile robot 700 may manipulate an object 740 at the end pose 720, such as lifting the object to transport. The autonomous mobile robot 700 may perform a similar process to compute a path to exit the trailer 730.

Example Method for Automated Trailer Loading and Unloading

Figure 8:
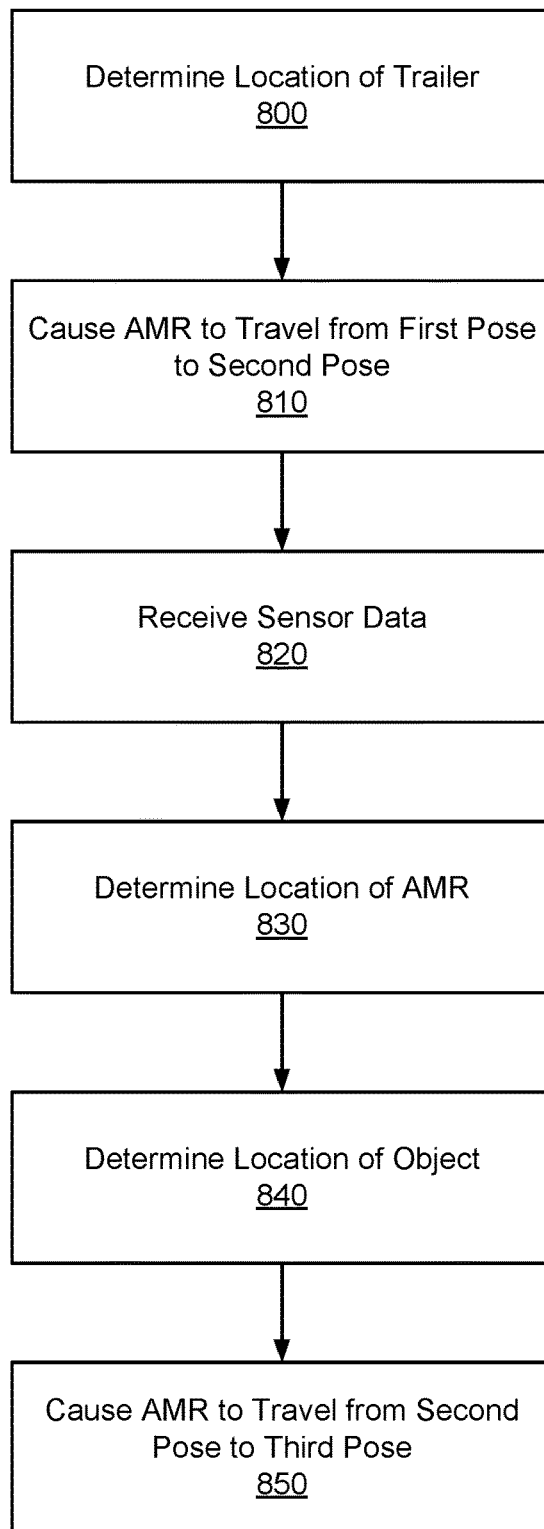
FIG. 8 is a flowchart for an example method for automated trailer loading and unloading, in accordance with some embodiments.

FIG. 8 is a flowchart for an example method for automated trailer loading and unloading, in accordance with some embodiments. Alternative embodiments may include more, fewer, or different steps, and the steps may be performed in a different order from that illustrated in FIG. 8. Additionally, while FIG. 8 is primarily described in terms of actions taken by an autonomous mobile robot, the steps may be performed, in part or in whole, by a central communication system in communication with an autonomous mobile robot.

The autonomous mobile robot determines 800 a location of a trailer with respect to an environment (e.g., a warehouse). The autonomous mobile robot is caused 810 to travel from a first pose (e.g., a current pose of the autonomous mobile robot) to a second pose near an entrance of the trailer. This second pose may be on or near a loading ramp that bridges the environment and the trailer.

The autonomous mobile robot receives 820 sensor data from a sensor while at the second pose. The sensor data describes the trailer and an object within a cargo area of the trailer. The autonomous mobile robot determines 830 a location of the autonomous mobile robot with respect to the trailer based on the sensor data. The autonomous mobile robot also determines 840 a location of the object with respect to the trailer based on the sensor data. The autonomous mobile robot is caused 850 to travel from the second pose to a third pose within the trailer based on the sensor data, the determined location of the autonomous mobile, and the determined location of the object. The third pose is a pose from which the autonomous mobile robot can manipulate the object.

Example Method for Pathfinding Using a Centerline Heuristic

Figure 9:
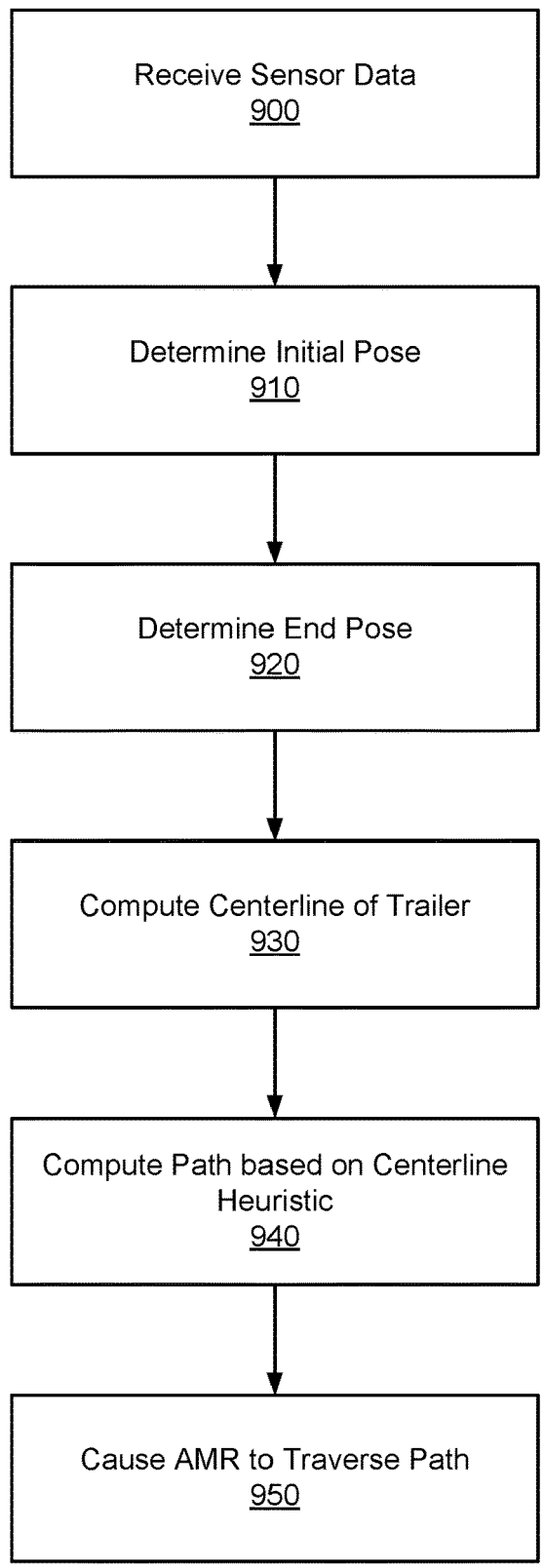
FIG. 9 is a flowchart for an example method for pathfinding using a centerline heuristic, in accordance with some embodiments.

FIG. 9 is a flowchart for an example method for pathfinding using a centerline heuristic, in accordance with some embodiments. Alternative embodiments may include more, fewer, or different steps, and the steps may be performed in a different order from that illustrated in FIG. 9. Additionally, while FIG. 9 is primarily described in terms of actions taken by an autonomous mobile robot, the steps may be performed, in part or in whole, by a central communication system in communication with an autonomous mobile robot.

An autonomous mobile robot receives 900 sensor data describing an environment (e.g., a warehouse) around the autonomous mobile robot. The autonomous mobile robot determines 910 an initial pose of the autonomous mobile robot relative to the trailer based on the sensor data and determines 920 an end pose for the autonomous mobile robot in the trailer based on the sensor data. The autonomous mobile robot computes 930 a centerline of the trailer based on the sensor data and computes 940 a path to the end pose. The autonomous mobile robot computes the centerline based on the sensor data and a centerline heuristic, where the centerline heuristic is a heuristic representing a distance of portions of the path from the centerline. The autonomous mobile robot is caused 950 to traverse the computed path to the end pose.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
  receiving, at an autonomous mobile robot, instructions to traverse to an initial pose at a docking point for a trailer, wherein the instructions to traverse comprise a path in a reference frame of a warehouse in which the autonomous mobile robot is located;
  traversing, by the autonomous mobile robot, to the initial pose based on the received instructions in the reference frame of the warehouse;
  capturing, by the autonomous mobile robot, sensor data describing an environment around the autonomous mobile robot at the initial pose;
  determining the initial pose of the autonomous mobile robot relative to a reference frame of the trailer based on the sensor data, wherein determining the initial pose of the autonomous mobile robot relative to the reference frame of the trailer comprises:
    identifying a part of the trailer based on the sensor data; and
    determining the initial pose of the autonomous mobile robot relative to the identified part of the trailer;
  determining an end pose for the autonomous mobile robot in the trailer, wherein the end pose is computed relative to the reference frame of the trailer based on the sensor data, wherein determining the end pose comprises:
    determining the end pose relative to the identified part of the trailer;

computing a centerline of the trailer in the reference frame of the trailer based on the sensor data;
computing a path in the reference frame of the trailer from the initial pose to the end pose by applying a path finding algorithm based on the sensor data and a centerline heuristic, wherein the centerline heuristic is a heuristic representing a distance of the path from the centerline, and wherein applying the pathfinding algorithm comprises:
  computing a cost of a plurality of location nodes within the trailer in the reference frame of the trainer using the centerline heuristic, wherein the cost of each location node is based on a distance of the location node from the computed centerline; and
  computing a path through a subset of the plurality of location nodes with a minimum total cost; and
causing the autonomous mobile robot to traverse the computed path to the end pose.

2. The method of claim 1, wherein the sensor data comprises image data, depth data, RFID data, GPS data, or LIDAR data.

3. The method of claim 1, wherein the end pose is a pose within the trailer at which the autonomous mobile robot can manipulate an object within the trailer.

4. The method of claim 1, wherein computing the path comprises:
  applying a pathfinding algorithm to compute the path from the initial pose to the end pose, wherein the pathfinding algorithm uses a plurality of heuristics to assign cost values to a set of location nodes within the trailer, and wherein the plurality of heuristics comprises the centerline heuristic.

5. The method of claim 4, wherein the plurality of heuristics comprises a heuristic representing a distance of a node from the end pose.

6. The method of claim 4, wherein the plurality of heuristics comprises a heuristic representing a distance of a node from an obstacle.

7. The method of claim 4, wherein the pathfinding algorithm comprises at least one of Hybrid A* or State Lattice Planner.

8. A non-transitory computer-readable medium storing instructions that, when executed by a processor, cause the processor to:
  receive, at an autonomous mobile robot, instructions to traverse to an initial pose at a docking point for a trailer, wherein the instructions to traverse comprise a path in a reference frame of a warehouse in which the autonomous mobile robot is located;
  traverse, by the autonomous mobile robot, to the initial pose based on the received instructions in the reference frame of the warehouse;
  capture, by the autonomous mobile robot, sensor data describing an environment around the autonomous mobile robot at the initial pose;
  determine the initial pose of the autonomous mobile robot relative to a reference frame of the trailer based on the sensor data, wherein determining the initial pose of the autonomous mobile robot relative to the reference frame of the trailer comprises:
    identifying a point on the trailer based on the sensor data; and
    determining the initial pose of the autonomous mobile robot relative to the identified point on the trailer;
  determine an end pose for the autonomous mobile robot in the trailer, wherein the end pose is computed relative to the reference frame of the trailer based on the sensor data, wherein determining the end pose comprises:
    determining the end pose relative to the identified point on the trailer;
  compute a centerline of the trailer in the reference frame of the trailer based on the sensor data;
  compute a path in the reference frame of the trailer from the initial pose to the end pose by applying a pathfinding algorithm based on the sensor data and a centerline heuristic, wherein the centerline heuristic is a heuristic representing a distance of the path from the centerline, and wherein applying the pathfinding algorithm comprises:
    computing a cost of a plurality of location nodes within the trailer in the reference frame of the trainer using the centerline heuristic, wherein the cost of each location node is based on a distance of the location node from the computed centerline; and
    computing a path through a subset of the plurality of location nodes with a minimum total cost; and
  cause the autonomous mobile robot to traverse the computed path to the end pose.

9. The computer-readable medium of claim 8, wherein the sensor data comprises image data, depth data, RFID data, GPS data, or LIDAR data.

10. The computer-readable medium of claim 8, wherein the end pose is a pose within the trailer at which the autonomous mobile robot can manipulate an object within the trailer.

11. The computer-readable medium of claim 8, wherein the instructions for computing the path comprise instructions that cause the processor to:
  apply a pathfinding algorithm to compute the path from the initial pose to the end pose, wherein the pathfinding algorithm uses a plurality of heuristics to assign cost values to a set of location nodes within the trailer, and wherein the plurality of heuristics comprises the centerline heuristic.

12. The computer-readable medium of claim 11, wherein the plurality of heuristics comprises a heuristic representing a distance of a node from the end pose.

13. The computer-readable medium of claim 11, wherein the plurality of heuristics comprises a heuristic representing a distance of a node from an obstacle.

14. The computer-readable medium of claim 11, wherein the pathfinding algorithm comprises at least one of Hybrid A* or State Lattice Planner.

15. An autonomous mobile robot comprising a processor and a non-transitory computer-readable medium storing instructions that, when executed by the processor, cause the processor to:
  receive, at an autonomous mobile robot, instructions to traverse to an initial pose at a docking point for a trailer, wherein the instructions to traverse comprise a path in a reference frame of a warehouse in which the autonomous mobile robot is located;
  traverse, by the autonomous mobile robot, to the initial pose based on the received instructions in the reference frame of the warehouse;
  capture, by the autonomous mobile robot, sensor data describing an environment around the autonomous mobile robot at the initial pose;
  determine the initial pose of the autonomous mobile robot relative to a reference frame of the trailer based on the sensor data, wherein determining the initial pose of the autonomous mobile robot relative to the reference frame of the trailer comprises:

identifying a point on the trailer based on the sensor data; and determining the initial pose of the autonomous mobile robot relative to the identified point on the trailer;

determine an end pose for the autonomous mobile robot in the trailer, wherein the end pose is computed relative to the reference frame of the trailer based on the sensor data, wherein determining the end pose comprises:

determining the end pose relative to the identified point on the trailer;

compute a centerline of the trailer in the reference frame of the trailer based on the sensor data;

compute a path in the reference frame of the trailer from the initial pose to the end pose by applying a pathfinding algorithm based on the sensor data and a centerline heuristic, wherein the centerline heuristic is a heuristic representing a distance of the path from the centerline, and wherein applying the pathfinding algorithm comprises:

computing a cost of a plurality of location nodes within the trailer in the reference frame of the trainer using the centerline heuristic, wherein the cost of each location node is based on a distance of the location node from the computed centerline; and computing a path through a subset of the plurality of location nodes with a minimum total cost; and cause the autonomous mobile robot to traverse the computed path to the end pose.

16. The autonomous mobile robot of claim 15, wherein the instructions for computing the path comprise instructions that cause the processor to:

apply a pathfinding algorithm to compute the path from the initial pose to the end pose, wherein the pathfinding algorithm uses a plurality of heuristics to assign cost values to a set of location nodes within the trailer, and wherein the plurality of heuristics comprises the centerline heuristic.

17. The autonomous mobile robot of claim 16, wherein the plurality of heuristics comprises a heuristic representing a distance of a node from the end pose.

18. The autonomous mobile robot of claim 16, wherein the plurality of heuristics comprises a heuristic representing a distance of a node from an obstacle.

* * * * *